(12) United States Patent
Ishikawa et al.

(10) Patent No.: US 9,467,582 B2
(45) Date of Patent: Oct. 11, 2016

(54) INFORMATION PROCESSING APPARATUS, DATA GENERATING APPARATUS, INFORMATION PROCESSING METHOD, AND INFORMATION PROCESSING SYSTEM (71) Applicant: Sony Corporation, Tokyo (JP)

(72) Inventors: Hirotaka Ishikawa, Kanagawa (JP); Yasuki Kanema, Tokyo (JP); Takeshi Iwatsu, Kanagawa (JP); Tohru Kadono, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/620,276

(22) Filed: Feb. 12, 2015

(65) Prior Publication Data
US 2015/0244879 A1 Aug. 27, 2015

(30) Foreign Application Priority Data

Feb. 21, 2014 (JP) ................................. 2014-032321

(51) Int. Cl.
*H04N 1/00* (2006.01)
*H04N 5/77* (2006.01)
*H04N 9/802* (2006.01)
*G11B 27/32* (2006.01)
*G11B 27/02* (2006.01)

(52) U.S. Cl.
CPC ........... *H04N 1/00214* (2013.01); *G11B 27/02* (2013.01); *G11B 27/32* (2013.01); *H04N 5/77* (2013.01); *H04N 9/802* (2013.01)

(58) Field of Classification Search
CPC ......................... H04N 5/77; H04N 21/43637
See application file for complete search history.

(56) References Cited

U.S. PATENT DOCUMENTS

| 7,277,125 | B2* | 10/2007 | Nishimura | ......... | H04N 1/00281 345/630 |
| 7,936,790 | B2* | 5/2011 | Schmidt | ................ | H04J 3/0667 370/503 |
| 2004/0165076 | A1* | 8/2004 | Nishimura | ......... | H04N 1/00281 348/211.2 |
| 2009/0059962 | A1* | 3/2009 | Schmidt | ................ | H04J 3/0667 370/503 |

FOREIGN PATENT DOCUMENTS

JP 2013-141272 A 7/2013

* cited by examiner

*Primary Examiner* — Ahmed A Berhan
(74) *Attorney, Agent, or Firm* — Wolf, Greenfield & Sacks, P.C.

(57) ABSTRACT

An information processing apparatus includes: a reception unit configured to receive a start request transmitted from an external apparatus; a time processing unit configured to obtain a time of receipt when the reception unit receives the start request and to give a time stamp to first data; and a transmission unit configured to transmit the time of receipt obtained by the time processing unit to the external apparatus, to transmit to the external apparatus the first data generated after the time of receipt and given the time stamp by the time processing unit, and to in real-time transmit second data generated after the time of receipt to the external apparatus.

14 Claims, 8 Drawing Sheets

INFORMATION PROCESSING APPARATUS, DATA GENERATING APPARATUS, INFORMATION PROCESSING METHOD, AND INFORMATION PROCESSING SYSTEM

CROSS REFERENCE TO RELATED APPLICATIONS

This application claims the benefit of Japanese Priority Patent Application JP 2014-032321 filed Feb. 21, 2014, the entire contents of which are incorporated herein by reference.

BACKGROUND

The present technology relates to an information processing apparatus capable of synchronizing various types of data, a data generating apparatus, an information processing method, and an information processing system.

There has been known a head-mounted display that is mounted on the head of a user to be capable of presenting an image to a part of a field of view of the user through a display in front of the eyes.

Japanese Patent Application Laid-open No. 2013-141272 has disclosed a head-mounted display including a camera and a microphone and being capable of recording a still image and a moving image. For example, such a head-mounted display can record a landscape viewed by a user as it is and thus can record activity of the user.

SUMMARY

Such a head-mounted display records video data and audio data. The video data and audio data are combined and thus moving image data is obtained. However, there is a demand for downsizing and weight reduction, and hence it is difficult to mount a processor having a high processing capability or a large-volume battery on the head-mounted display.

Thus, the video data and audio data generated by the head-mounted display needs to be transmitted to an external apparatus such as a smartphone and combined by the external apparatus into the moving image data.

For example, the head-mounted display can use Wi-Fi or Bluetooth (registered trademark) for transmitting the video data and audio data to the external apparatus. In comparison with the Bluetooth (registered trademark), the Wi-Fi has a higher transmission speed and a larger power consumption. Thus, the Wi-Fi has to be used for transmission of video data having a large volume. In contrast, the lower-power consumption Bluetooth (registered trademark) is favorably used for transmission of audio data having a small volume.

However, transmitting the video data and audio data to the external apparatus by the different transmission systems makes it difficult for the external apparatus to synchronize the video data with the audio data. Therefore, the moving image data combined by the external apparatus sometimes has a deviation between the video data and the audio data.

In view of the above-mentioned circumstances, it is desirable to provide an information processing apparatus capable of synchronizing data transmitted by different systems, a data generating apparatus, an information processing method, and an information processing system.

According to an embodiment of the present technology, there is provided an information processing apparatus including a reception unit, a time processing unit, and a transmission unit.

The reception unit is configured to receive a start request transmitted from an external apparatus.

The time processing unit is configured to obtain a time of receipt when the reception unit receives the start request and to give a time stamp to first data.

The transmission unit is configured to transmit the time of receipt obtained by the time processing unit to the external apparatus, to transmit to the external apparatus the first data generated after the time of receipt and given the time stamp by the time processing unit, and to in real-time transmit second data generated after the time of receipt to the external apparatus.

With this configuration, the external apparatus is capable of knowing time information of the first data and second data based on the timer of the information processing apparatus. That is, the external apparatus is capable of knowing the time information of the first data base on the time stamp given to the first data by the information processing apparatus. At the same time, the external apparatus is capable of knowing the time information of the second data base on an elapse time from the time of receipt obtained by the information processing apparatus. Thus, the external apparatus is capable of accurately synchronizing the first data with the second data.

The first data may be still image data and the second data may be audio data.

With this configuration, the external apparatus is capable of generating data in which the still image data is synchronized with the audio data.

The transmission unit may be configured to transmit the still image data by Wi-Fi and transmit the audio data by Bluetooth (registered trademark).

This makes it possible to favorably transmit the still image data and the audio data.

The information processing apparatus may further include: a camera configured to generate the still image data; and an audio input unit configured to generate the audio data.

With this configuration, the external apparatus is capable of generating data in which the still image data generated by the camera is synchronized with the audio data generated by the audio input unit.

The camera may be configured to be mountable on a head of a user.

With this configuration, the information processing apparatus configured to be wearable can be provided.

The camera may be configured to generate the still image data every predetermined period of time.

With this configuration, the external apparatus is capable of generating video data from a plurality of still image data pieces and capable of generating the moving image data from the video data and the audio data.

The information processing apparatus may further include an operation unit configured to receive an input operation made by a user.

The transmission unit may be configured to notify the external apparatus to transmit the start request when the operation unit receives the input operation.

With this configuration, the external apparatus is capable of generating data such as moving image data according to the input operation made by the user.

According to another embodiment of the present technology, there is provided an information processing apparatus including a transmission unit and a time processing unit.

The transmission unit is configured to transmit a start request to an external apparatus, to transmit to the external apparatus a time of transmission when the start request is transmitted, to transmit to the external apparatus first data generated after the time of transmission and given a time stamp, and to in real-time transmit second data generated after the time of transmission to the external apparatus.

The time processing unit is configured to obtain the time of transmission and give the time stamp to the first data.

With this configuration, the external apparatus is capable of knowing time information of the first data and second data based on the timer of the information processing apparatus. That is, the external apparatus is capable of knowing the time information of the first data base on the time stamp given to the first data by the information processing apparatus. At the same time, the external apparatus is capable of knowing the time information of the second data base on an elapse time from the time of transmission obtained by the information processing apparatus. Thus, the external apparatus is capable of accurately synchronizing the first data with the second data.

According to an embodiment of the present technology, there is provided a data generating apparatus including a transmission unit, a time processing unit, a reception unit, and a composite processing unit.

The transmission unit is configured to transmit a start request to an information processing apparatus.

The time processing unit is configured to obtain a time of transmission when the transmission unit transmits the start request.

The reception unit is configured to receive a time of receipt when the information processing apparatus receives the start request, which is obtained and transmitted by the information processing apparatus, to receive first data generated after the time of receipt, given a time stamp by the information processing apparatus, and transmitted, and to receive second data generated after the time of receipt and in real-time transmitted.

The composite processing unit is configured to use the time of transmission obtained by the time processing unit and the time of receipt to synchronize the first data with the second data.

With this configuration, the data generating apparatus is capable of knowing time information of the first data and second data based on the timer of the information processing apparatus. That is, the data generating apparatus is capable of knowing the time information of the first data base on the time stamp given to the first data by the information processing apparatus. At this time, the data generating apparatus is capable of knowing the time information of the second data base on an elapse time from the time of receipt obtained by the information processing apparatus. Thus, the data generating apparatus is capable of accurately synchronizing the first data with the second data.

The composite processing unit may be configured to consider the time of transmission as being the same as the time of receipt and synchronize the first data with the second data.

With this configuration, it becomes possible to easily synchronize the first data with the second data.

The first data may be still image data and the second data may be audio data.

Further, the composite processing unit may be configured to combine the still image data with the audio data to generate moving image data.

With this configuration, the data generating apparatus is capable of generating the moving image data.

The composite processing unit may be configured to use a time lag in the real-time transmission of the second data for synchronizing the first data with the second data.

This configuration makes it possible to more accurately synchronize the first data with the second data.

According to an embodiment of the present technology, there is provided an information processing method. In the information processing method, a start request is transmitted to the first apparatus by a second apparatus configured to be communicable with a first apparatus.

A time of transmission when the start request is transmitted is obtained by the second apparatus.

The start request is received by the first apparatus.

A time of receipt when the start request is received is obtained by the first apparatus.

The time of receipt is transmitted by the first apparatus to the second apparatus.

A time stamp is given to first data, which is generated after the time of receipt, by the first apparatus.

The first data given the time stamp is transmitted to the second apparatus by the first apparatus.

Second data, which is generated after the time of receipt, is in real-time transmitted by the first apparatus to the second apparatus.

The time of receipt, the first data, and the second data are received by the second apparatus.

The second apparatus uses the time of transmission and the time of receipt to synchronize the first data with the second data.

With this configuration, the second apparatus (data generating apparatus) is capable of knowing time information of the first data and second data based on the timer of the first apparatus (information processing apparatus). That is, the second apparatus is capable of knowing the time information of the first data base on the time stamp given to the first data by the first apparatus. At the same time, the second apparatus is capable of knowing the time information of the second data based on an elapse time from the time of receipt obtained by the first apparatus. Thus, the second apparatus is capable of accurately synchronizing the first data with the second data.

According to an embodiment of the present technology, there is provided an information processing system including a first apparatus and a second apparatus configured to be communicable with the first apparatus.

The first apparatus includes a reception unit, a timer, a time processing unit, and a transmission unit.

The reception unit is configured to receive a start request transmitted by the second apparatus.

The timer is configured to count a first point of time.

The time processing unit is configured to obtain a time of receipt that is a first point of time when the reception unit receives the start request and to give the first data a time stamp based on the first point of time.

The transmission unit is configured to transmit the time of receipt obtained by the time processing unit to the external apparatus, to transmit to the external apparatus the first data generated after the time of receipt and given the time stamp by the time processing unit, and to in real-time transmit second data generated after the time of receipt to the external apparatus.

The second apparatus includes a transmission unit, a timer, a time processing unit, a reception unit, and a composite processing unit.

The transmission unit is configured to transmit the first apparatus to the start request.

The timer is configured to count a second point of time different from the first point of time.

The time processing unit is configured to obtain a time of transmission that is the second point of time when the transmission unit of the second apparatus transmits the start request.

The reception unit is configured to receive the time of receipt, the first data, and the second data that are transmitted by the first apparatus.

The composite processing unit is configured to use the time of transmission obtained by the time processing unit of the second apparatus and the time of receipt to synchronize the first data with the second data.

With this configuration, the second apparatus (data generating apparatus) is capable of knowing the time information of the first data and second data based on the timer of the first apparatus (information processing apparatus). That is, the second apparatus is capable of knowing the time information of the first data base on a time stamp given to the first data by the first apparatus. At the same time, the second apparatus is capable of knowing the time information of the second data base on an elapse time from the time of receipt obtained by the first apparatus. Thus, the second apparatus is capable of accurately synchronizing the first data with the second data.

As described above, according to the embodiments of the present technology, it is possible to provide an information processing apparatus capable of synchronizing data transmitted by different systems, a data generating apparatus, an information processing method, and an information processing system.

It should be noted that the effects described here are not necessarily limited and any effect described in the present disclosure may be provided.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present technology will be described with reference to the drawings.

Figure 1:
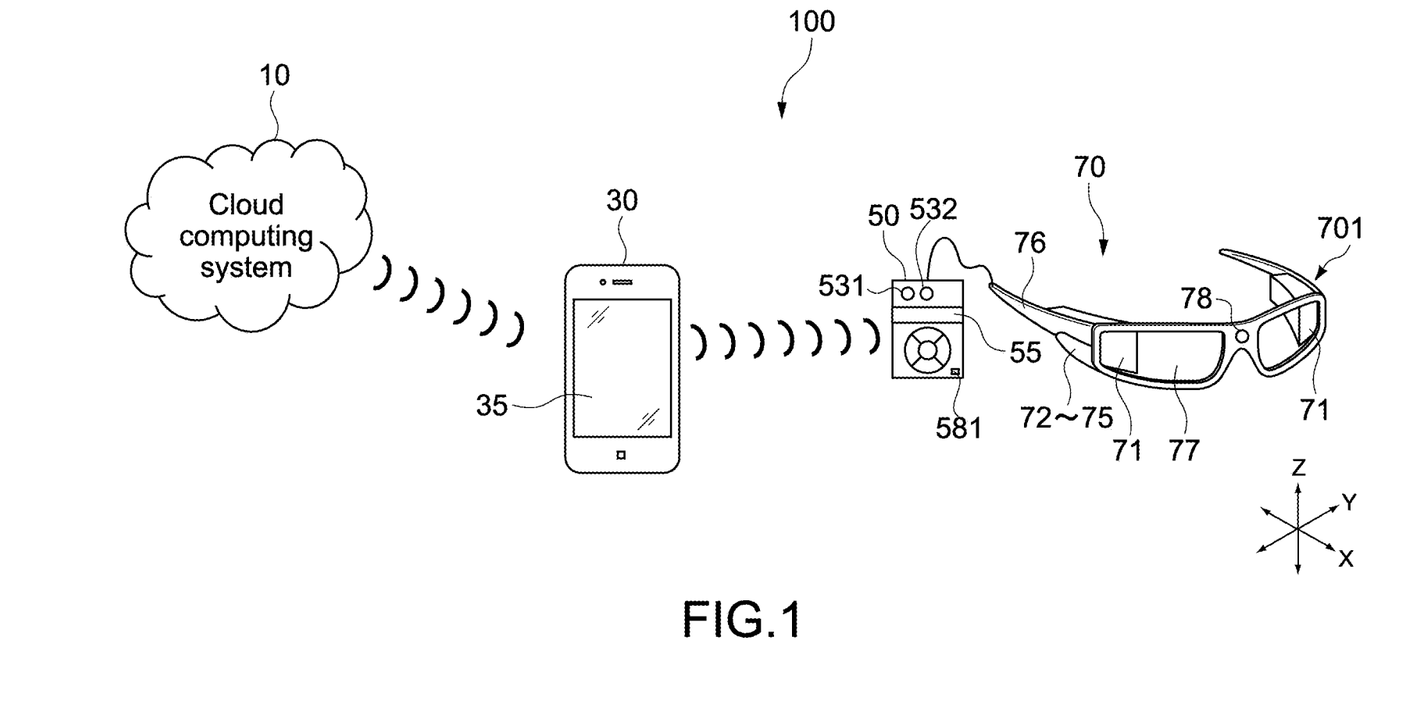
FIG. 1 is a view showing a configuration of an information processing system according to an embodiment of the present technology.

1) Entire Configuration of Information Processing System Using Wearable Apparatus FIG. 1 is a configuration of an information processing system 100 according to an embodiment of the present technology.

The system 100 mainly includes a portable terminal 30, a wearable apparatus (wearable display) 70, and a control box 50 functioning as a control apparatus that controls the wearable apparatus 70.

The portable terminal 30 is typically a cellular phone such as a smartphone. The portable terminal 30 may be a tablet apparatus or another personal computer (PC).

Although the wearable apparatus 70 is a head-mounted type as shown in the figure, the wearable apparatus 70 is not limited thereto and may be for example a list band type or a neck band type.

The portable terminal 30 is configured to be connectable to a cloud computing system 10. The cloud computing system 10 includes a server computer and the like connected to a telecommunications network such as the Internet.

The control box 50 is typically wiredly connected to the wearable apparatus 70. For operating the wearable apparatus 70, the user puts the wearable apparatus 70 on the head and operates the control box 50 with the fingers.

2) Configurations of Devices

Figure 2:
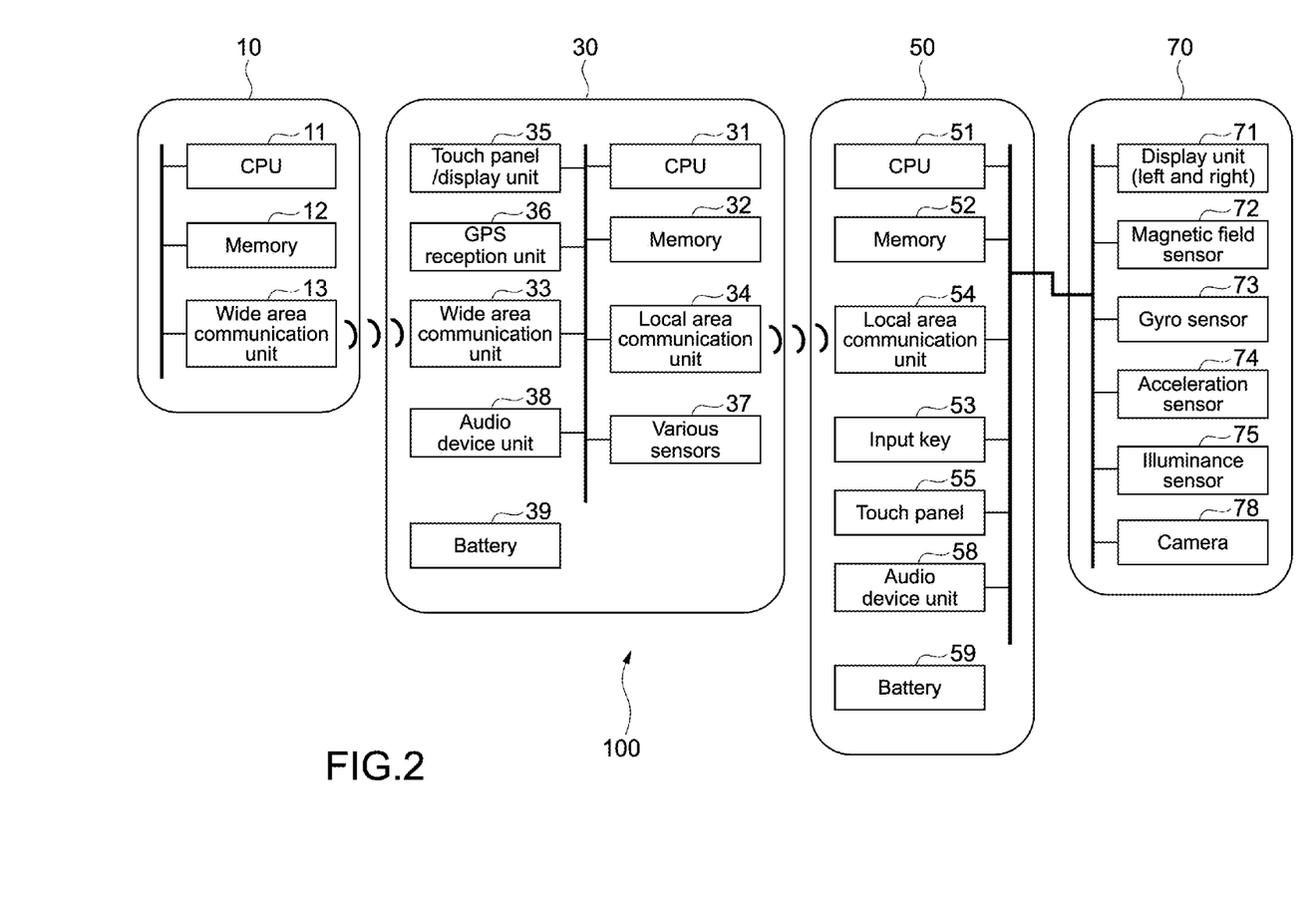
FIG. 2 is a block diagram showing configurations of devices of the information processing system.

FIG. 2 is a block diagram showing configurations of devices of the information processing system 100.

2-1) Portable Terminal

The portable terminal 30 (e.g., smartphone) mainly includes a central processing unit (CPU) 31, a memory 32, a touch panel/display unit 35, a wide area communication unit 33, and a local area communication unit 34. Further, the portable terminal 30 includes various sensors 37 including a motion sensor, a camera, and the like, a global positioning system (GPS) reception unit 36, an audio device unit 38, a battery 39, and the like. At least the portable terminal 30 (or the portable terminal 30 and the cloud computing system 10) functions as an external apparatus of the wearable apparatus 70.

The wide area communication unit 33 is configured to be communicable by a communication system, for example, third generation (3G) or long term evolution (LTE). The local area communication unit 34 is configured to be communicable by, for example, a wireless local area network (LAN) communication system such as Wi-Fi and/or a short-distance wireless communication system such as Bluetooth (registered trademark) and infrared communication. The local area communication unit 34 functions as a reception unit 301 and a transmission unit 302 (see FIG. 7) between the portable terminal 30 and the control box 50.

The portable terminal 30 may include, in addition to the local area communication unit 34, an individual identification device using a short-distance wireless communication system, for example, a radio frequency identification (RFID).

The audio device unit 38 includes a microphone serving as an audio input unit and a speaker serving as an audio output unit.

2-2) Wearable Apparatus

The wearable apparatus 70 includes display units 71, various sensors 72 to 75, and a camera 78. The display units 71 are, as shown in FIG. 1, compact projectors disposed on left and right frames 76 of the head-mounted type wearable apparatus 70, for example. In the head-mounted type wearable apparatus 70, identical image light beams or image light beams having a disparity are emitted from the projectors, guided by a light guide plate 77, and emitted to the eye balls of the user from a predetermined region of the light guide plate 77.

Examples of the various sensors of the wearable apparatus 70 include a magnetic field sensor 72, a gyro sensor 73, an acceleration sensor 74, and a luminance sensor 75.

The camera 78 configures an imaging unit capable of imaging a subject in a field-of-view direction of the user. The camera 78 is mounted on a mounting unit 701 and disposed between the left and right display units 71 in this embodiment (FIG. 1). Note that the mounting position of the camera 78 is not limited to the above-mentioned example.

The camera 78 is capable of capturing a still image and a moving image. The camera 78 is typically configured by an imaging element such as a complementary metal oxide semiconductor (CMOS) sensor and a charge coupled device (CCD) sensor.

Note that the display unit 71 may be disposed to only one of the left and right of the wearable apparatus 70. The wearable apparatus 70 is not limited to the projector type and may include display units 71 that directly emit image light to the eye balls.

2-3) Control Box

The control box 50 includes a CPU 51, a memory 52, a local area communication unit 54, an input key 53, a touch panel 55, an audio device unit 58, a battery 59, and the like.

The control box 50 may be configured as an accessory device of the wearable apparatus 70 (e.g., part of wearable apparatus 70) or may be configured as a controller independent from the wearable apparatus 70.

The CPU 51 generally controls the units in the control box 50 and the wearable apparatus 70. The control box 50 may include a programmable logic device (PLD) such as a field programmable gate array (FPGA) instead of the CPU 51.

The local area communication unit 54 is configured to be communicable to the local area communication unit 34 of the portable terminal 30 through the above-mentioned communication system. The local area communication unit 54 functions as a reception unit 501 and a transmission unit 502 (see FIG. 7) between the control box 50 and the portable terminal 30.

The audio device unit 58 includes the microphone 581 (see FIG. 1) that is an audio input unit capable of converting audio into an electrical signal (see FIG. 1) and a speaker that is an audio output unit capable of converting audio into an electrical signal.

The input key 53 is one or more physical keys disposed to the control box 50 and operated by the user. The input key 53 includes, for example, a power source key, a back key, ON/OFF keys of the display units 71, an operation button 531 of the camera 78 (see FIG. 1), and an operation button 532 of the microphone 581 (see FIG. 1).

The operation button 531 configures an operation unit into which the user inputs an operation upon imaging. The operation button 531 functions as a shutter button on a still image capturing mode and functions as an imaging start/end button on a moving image capturing mode. The operation button 532 functions as a start/end button of audio recording on an audio recording mode.

The operation button 532 configures the operation unit into which the user inputs an operation upon audio recording and functions as an audio recording start/end button.

The touch panel 55 is an operation device disposed on a surface of the control box 50 (see FIG. 1) and operated by the user. The input key 53 and the touch panel 55 function as the operation unit of the wearable apparatus 70.

The control box 50 may include, in addition to the local area communication unit 54, a communication device using a short-distance wireless communication system, for example, the above-mentioned RFID. With this, by the user starting predetermined application software in the portable terminal 30 and bringing the portable terminal 30 closer to the control box 50, pairing of these devices can be almost automatically performed.

Alternatively, for example, by the user bringing the portable terminal 30 closer to the control box 50, the portable terminal 30 may almost automatically download application software for pairing them from the cloud and install the application software.

Of course, even without such a short-distance wireless communication device, the control box 50 can be paired with the portable terminal 30 using the local area communication unit 54.

2-4) Cloud Computing System

For example, the server computer in the cloud computing system 10 includes a CPU 11, a memory 12, and a wide area communication unit 13 configured to be communicable with the portable terminal 30.

3) Configuration of Software

Figure 3:
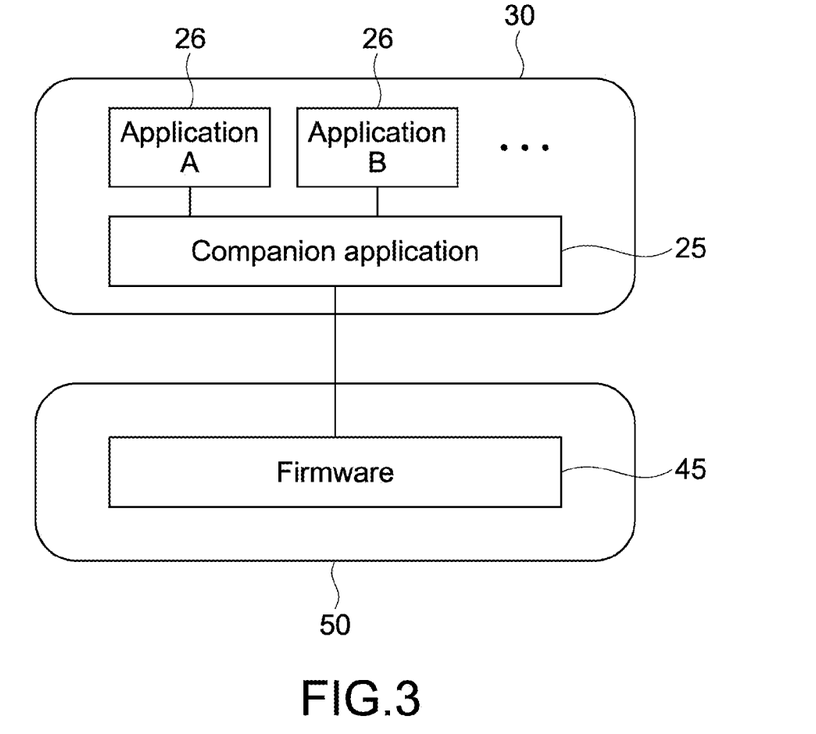
FIG. 3 is a view showing configurations of software mounted on a portable terminal and a control box of the information processing system.

FIG. 3 shows configurations of software mounted on the portable terminal 30 and the control box 50.

The portable terminal 30 stores general application software (hereinafter, simply referred to as "application") 26 and a companion application 25 in the memory 32. These applications 25 and 26 are configured to operate in an operating system (OS) installed in the portable terminal 30 by default.

Examples of the general applications 26 include a social networking service (SNS) application including a mini blog, a social communication site, and the like, a voice recognition application, a camera application, medium reproduction, news, and weather forecast service.

The companion application 25 functions to convert default data and user data of these applications 26 into data of a format that can be displayed on each display unit 71 of the wearable apparatus 70. For example, by the portable terminal 30 downloading the companion application 25 from the cloud computing system 10, the companion application 25 is installed into the portable terminal 30.

The control box 50 includes in the memory 52 firmware 45 that cooperates with the companion application 25 after pairing. The camera application for operating the camera 78, a setting application in a setting screen to be described later, and the like are installed into the firmware 45 by default.

Figure 4:
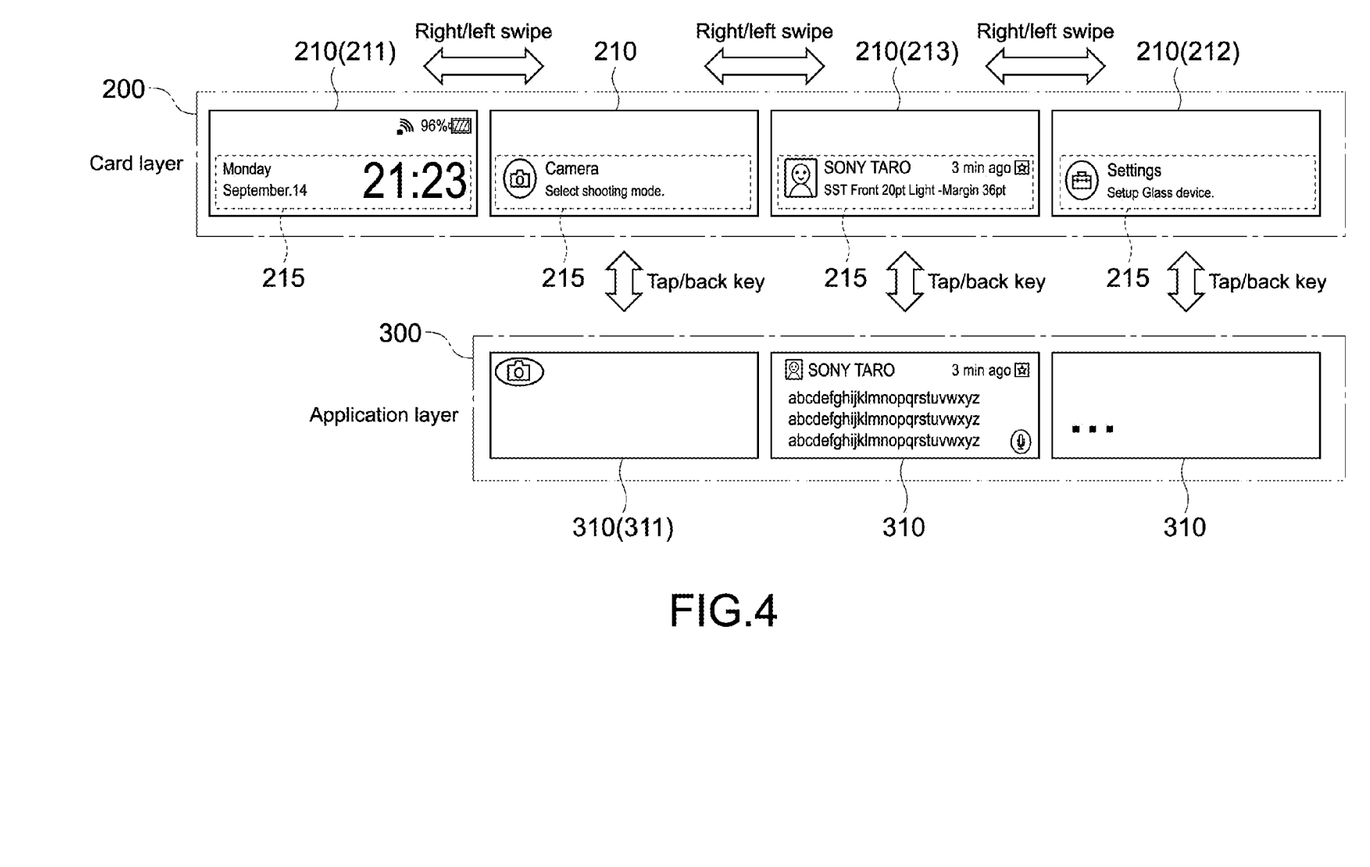
FIG. 4 is a view showing an example of a screen displayed on a display unit of a wearable apparatus of the information processing system.

4) Screen Examples Displayed in Wearable Apparatus and Operation Example of Information Processing System 4-1) Screen Examples Displayed in Wearable Apparatus FIG. 4 shows screen examples displayed on the display unit 71 of the wearable apparatus 70. Note that, hereinafter, for the sake of description, it is assumed that a subject for processing of the portable terminal 30 is the companion application 25 and a subject for processing of the control box 50 is the firmware 45.

4-1a) Screen Example of Card Layer

A layer shown on the upper side of FIG. 4 will be referred to as a "card layer 200." The card layer 200 includes various card screens 210 including, for example, a home screen 211 and a setting screen 212 by default. Further, the card layer 200 includes a card screen 213 of the applications 26 (see FIG. 3) registered by the user.

Each of the card screens 210 includes a card image 215 occupying an almost lower half region of the entire card screen, for example. The card image (excluding card image of home screen 211) described herein is like an icon or widget and is a graphical user interface (GUI) for accessing an application. One card image 215 is provided for one card screen 210.

The user can add the card screen 210 (card image 215) by registration. For example, by the user using the portable terminal 30 to perform a registration operation on the application 26 installed in the portable terminal 30, the companion application 25 generates the card image 215 corresponding to the application 26.

The card image 215 corresponding to the application is, for example, an image including in the card image 215 a mark or a character representing the application. As will be described later, basically, the companion application 25 stores card images 215 generated by itself in the memory 32 and the firmware 45 also stores a predetermined number of card images 215 of them in the memory 52.

The firmware 45 in the control box 50 is configured to display these card screens 210 on the display unit 71 one by one. In the same layer, by the user inputting a left/right swipe operation via the touch panel 55, the firmware 45 sequentially displays the card screens 210 on the display unit 71.

Note that the "setting" accessible from the setting screen 212 of the card screens 210 is also one of the application software modules and is an application stored in the control box 50 by default.

4-1b) Screen Example of Application Layer

The layer shown on the lower side of FIG. 4 will be referred to as an "application layer 300." The application layer 300 basically includes (an application image of) an application screen 310 accessible via the card layer 200, in which each application of the card screen 210 is activated.

The display unit 71 displays these application images 310 one by one. The user can access the application layer 300 via the card layer 200. For accessing the application layer 300, the user performs a tap operation with the card screen 210 selected in the card layer 200 being displayed on the display unit 71. Then, the firmware 45 displays the application image 310 corresponding to the card screen 210 on the display unit 71. For example, for activating the camera application, the firmware 45 displays an application image 311 corresponding to the camera application on the display unit 71.

For returning from the application image 310 to the card screen 210, the user presses a back key provided as the input key 53 (see FIG. 2) of the control box 50.

In the application layer 300, by performing a swipe operation on the touch panel 55 left or right with an arbitrary application image 310 being displayed, the user can change the application image 310 in this application. For example, the user can change a first function in one application and a second function different from the first function of the application to each other. The number of functions (number of application images) depends on an application.

In the case of the camera application, for example, the first function is a screen on the still image capturing mode and the second function is a screen on the moving image capturing mode. Note that the camera application installed in the firmware 45 by default displays an image obtained by the camera 78 on the display unit 71.

Note that the direction in which the user performs the swipe operation with the finger may coincide with the direction in which the image is moved or these directions may be opposite. It can be changed by user setting.

4-2) Changing Processing of Card Screen in Card Layer

Typically, the companion application 25 of the portable terminal 30 stores all the registered card images 215 in the memory 32. On the other hand, the firmware 45 stores a predetermined number of card images 215 (e.g., a predetermined number of card images 215 in registration order) of the stored card images 215 in the memory 52 of the control box 50. Then, the firmware 45 extracts from the memory 52 the card image 215 designated by the user through the touch panel 55 and displays it on the display unit 71. Further, the firmware 45 requests the memory 32 of the portable terminal 30 to transmit the card image 215 via the companion application 25 depending on needs and receives and displays it on the display unit 71. Specifically, the firmware 45 and the companion application 25 operates in the following manner.

Figure 5:
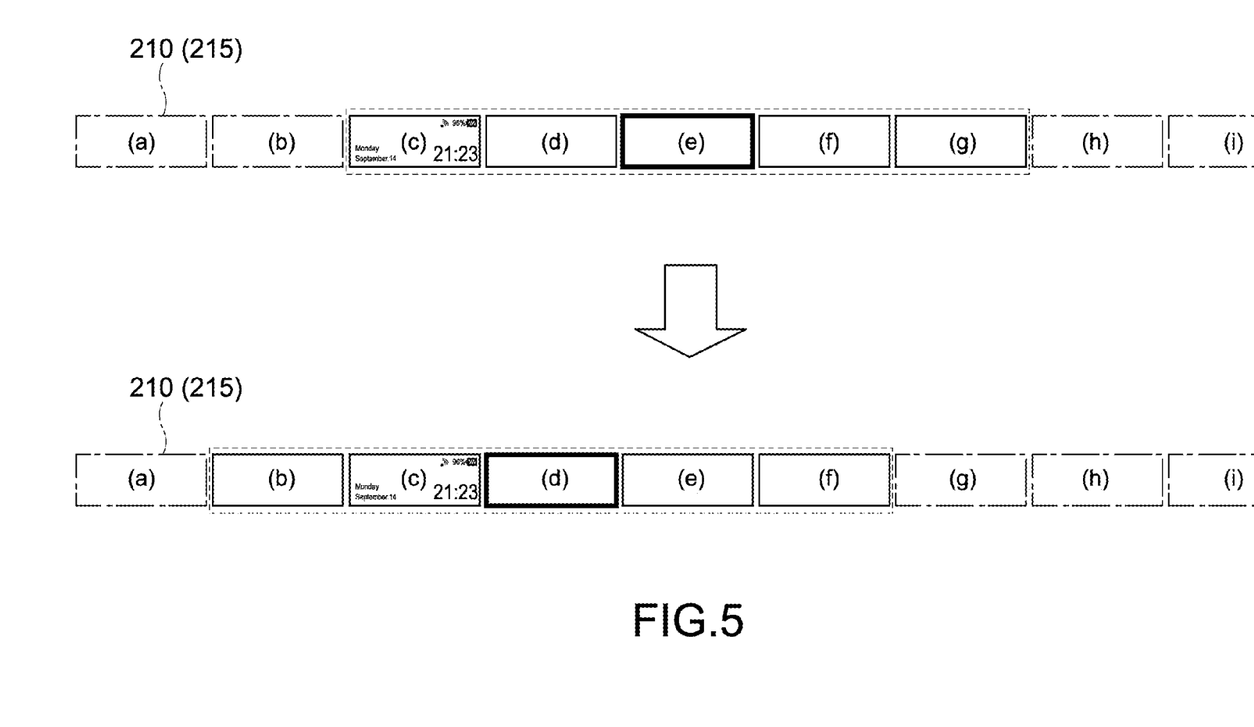
FIG. 5 is a view for explaining an operation of changing a card screen in a card layer in the information processing system.

FIG. 5 is a view for explaining an operation of changing the card screen 210 in the card layer 200. As shown in FIG. 5, for example, the memory 32 of the portable terminal 30 stores nine card images 215 (a) to (i). It is assumed that the memory 52 of the control box 50 stores five card images 215 (c) to (g) (surrounded by broken line) of the nine card images 215 (a) to (i). The five card images 215 (c) to (g) are continuous card images 215. At a current time, the bolded card image 215 (e) is displayed on the display unit 71. Note that the card image 215 (c) is a card image of a home screen.

It is assumed that, under the state shown in FIG. 5, the user inputs a swipe operation for moving the card screens 210 left. Then, as shown on the lower side of FIG. 5, the firmware 45 changes the currently displayed card image 215 (e) to the card image 215 (d) and discards the stored card image 215 (g) at an end (right end).

When the swipe operation is input, the firmware 45 notifies the portable terminal 30 of the input operation information. The companion application 25 extracts the card image 215 (b) newly positioned at an end (left end) from the memory 32 and transmits it to the control box 50. The firmware 45 receives and stores it in the memory 52.

In this manner, the firmware 45 keeps the predetermined number of (five) card images 215 stored in the memory 52.

Processing as described above can smoothly change the card screen 210 while reducing the necessary memory capacity of the control box 50 or reducing the cost by the use of a small-capacity memory.

Note that the control box 50 may keep the card image 215 of the home screen 211 and the card images 215 of the screens of the default applications, for example, the camera application. In this case, the control box 50 only needs to store in the memory 52 a predetermined number of card images 215 or less excluding those of the home screen 211 and default applications.

5) Audio Recording Mode, Still Image Capturing Mode, and Moving Image Capturing Mode The information processing system 100 shown in FIG. 1 includes the audio recording mode of generating and recording audio data by the microphone 581, the still image capturing mode of generating and recording still image data by the camera 78, and a moving image capturing mode of generating and recording moving image data by the camera 78 and the microphone 581.

The generated audio data, still image data, and moving image data are sequentially stored in the memory 32 of the portable terminal 30 and freely accessible by the user.

5-1) Audio Recording Mode

On the audio recording mode of the information processing system 100, when the operation button 532 receives an input operation made by the user, the control box 50 starts audio capturing, that is, generation of audio data by the microphone 581. When the operation button 532 receives an input operation made by the user again, the control box 50 terminates the generation of the audio data.

The audio data generated by the microphone 581 is stored in the memory 52 as a single audio data piece in a time series between the two input operations performed on the operation button 532 by the user. The audio data stored in the memory 52 is transmitted by the local area communication unit 54 to the portable terminal 30 and stored in the memory 32.

The Bluetooth (registered trademark) or the Wi-Fi can be used for transmission of the audio data to the portable terminal 30 through the local area communication unit 54. However, the audio data has a small volume, and hence it is favorable to use the lower-power consumption Bluetooth (registered trademark) for transmission of the audio data to the portable terminal 30.

Further, the information processing system 100 is also capable of performing real-time transmission of transmitting the audio data generated by the microphone 581 to the portable terminal 30 without storing it in the memory 52. In the real-time transmission, the audio data is not stored in the memory 52 of the control box 50 and is stored directly in the memory 32 of the portable terminal 30.

It is favorable to use the lower-power-consumption Bluetooth (registered trademark) also for the real-time transmission of the audio data to the portable terminal 30 through the local area communication unit 54. More specifically, a hands free profile (HFP) is suitable as a profile of the Bluetooth (registered trademark) used for the real-time transmission of the audio data.

5-2) Still Image Capturing Mode and Moving Image Capturing Mode

The still image capturing mode and the moving image capturing mode of the information processing system 100 can be operated in the camera application. The still image capturing mode and the moving image capturing mode can be changed in the camera application.

Figure 6:
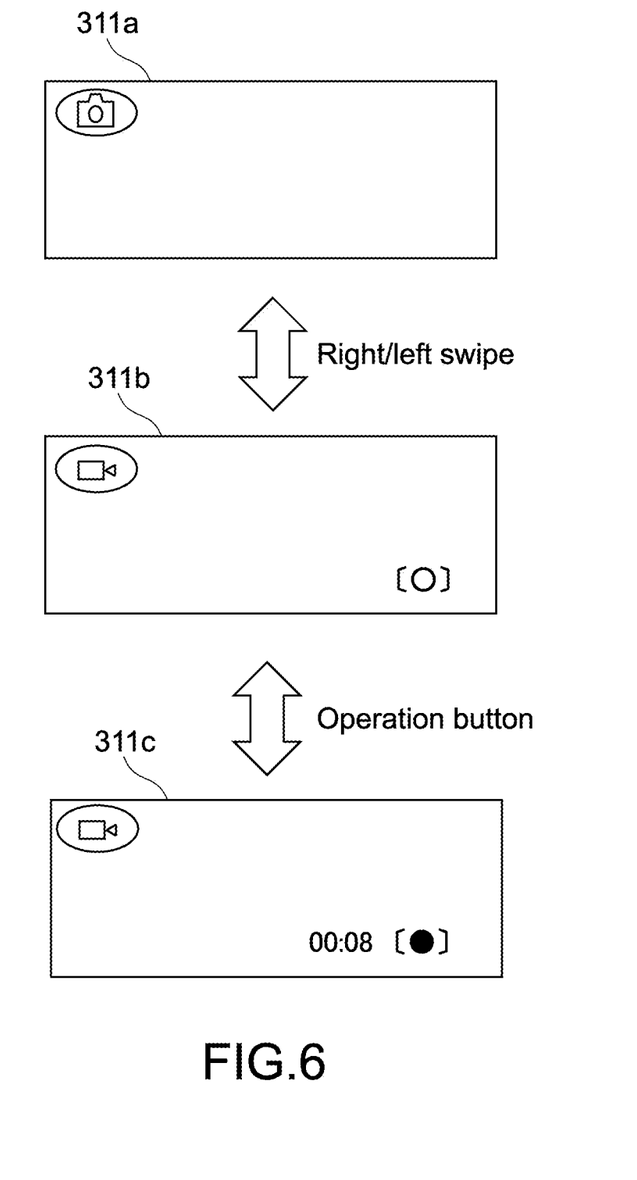
FIG. 6 is a view showing an example of a screen of a camera application displayed on the display unit of the wearable apparatus of the information processing system.

FIG. 6 is a view showing application images 311 of the camera application. The application images 311 include application images 311*a*, 311*b*, and 311*c* displayed according to the function of the camera application.

When the camera application is activated, an application image 311*a* corresponding to the still image capturing mode is first displayed. When the user performs a right swipe operation on the application image 311*a*, the application image 311*b* corresponding to the moving image capturing mode is displayed. When the user performs a left swipe operation on the application image 311*b*, the application image 311*a* is displayed again.

5-2a) Still Image Capturing Mode

The still image capturing mode of the information processing system 100 can be operated when the application image 311*a* is being displayed.

On the still image capturing mode, when the operation button (operation unit) 531 receives an input operation made by the user, the control box 50 uses the camera 78 to perform imaging, that is, generation of still image data. The generated still image data is stored in the memory 52. The still image data stored in the memory 52 is transmitted to the portable terminal 30 through the local area communication unit 54 and stored in the memory 32.

The Bluetooth (registered trademark) or Wi-Fi can be used for transmission of the still image data to the portable terminal 30 by the local area communication unit 54. The still image data has a large volume, and hence it is favorable to use the Wi-Fi for transmission of the still image data to the portable terminal 30. Note that it is also possible to reduce the power consumption by using the Bluetooth (registered trademark) for transmission of still image data having a small volume to the portable terminal 30.

5-2b) Moving Image Capturing Mode

The still image capturing mode of the information processing system 100 can be operated when the application image 311*b* is displayed.

The operation button 531 receives an input operation made by the user in the application image 311*b*, and then the application image 311*c* corresponding to the moving image capturing mode being operated is displayed and an operation on the moving image capturing mode is started.

The operation button 531 receives an input operation made by the user again in the operated application image 311*c*, and then the application image 311*b* corresponding to the moving image capturing mode in standby state is displayed again and the operation on the moving image capturing mode is stopped.

On the moving image capturing mode, the control box 50 mainly functions as an information processing apparatus that generates the still image data and audio data forming the moving image data. The portable terminal 30 mainly functions as a data generating apparatus that combines the still image data and audio data received from the control box 50 to generate the moving image data.

The still image data and audio data generated by the control box 50 are transmitted to the portable terminal 30. The control box 50 uses the Wi-Fi for transmission of the still image data having a large volume and uses a hands free profile (HFP) for transmission of the audio data having a small volume.

As long as the received still image data and audio data both include time stamps being time information for synchronization, the portable terminal 30 is capable of synchronizing the still image data with the audio data based on the time stamps. However, the Wi-Fi is capable of transmitting data including a time stamp that is the time information for synchronization while the hands free profile (HFP) is not capable of transmitting data including a time stamp.

That is, still image data received by the portable terminal 30 includes a time stamp while audio data does not include a time stamp. Therefore, the portable terminal 30 is not capable of synchronizing the still image data with the audio data based on the time stamps.

In view of this, for transmitting the audio data not including the time stamp, the information processing system 100 uses real-time transmission of transmitting the audio data generated by the microphone 581 to the portable terminal 30 as it is. This enables the still image data and the audio data to be favorably synchronized with each other. Hereinafter, moving image data generation on the moving image capturing mode of the information processing system 100 will be described in details.

Figure 7:
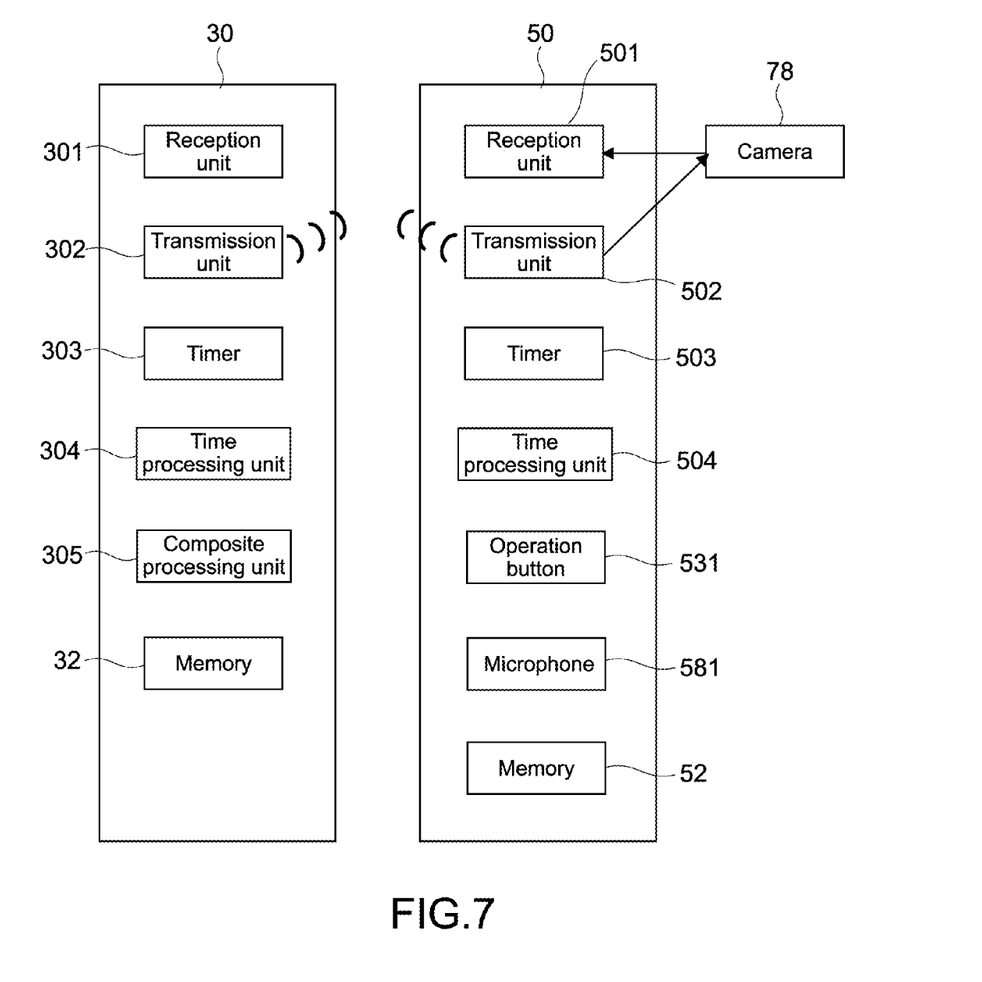
FIG. 7 is a block diagram showing a detailed configuration of a portable terminal and a control box of the information processing system.

6) Generation of Moving Image Data on Moving Image Capturing Mode 6-1) Configuration Relating to Moving Image Capturing Mode FIG. 7 is a block diagram showing a configuration relating to the moving image capturing mode of the information processing system 100.

The control box 50 mainly uses the reception unit 501 and transmission unit 502 that configure the local area communication unit 54 (see FIG. 1), the operation button 531 (see FIG. 1), the microphone 581 (see FIG. 1), and the memory 52 (see FIG. 2) for generating the moving image data.

Further, the control box 50 includes a timer 503 that counts time therein and provides a system time of the control box 50 and a time processing unit 504 for associating data with the time.

The portable terminal 30 mainly uses the reception unit 301 and transmission unit 301 that configure the local area communication unit 34 (see FIG. 1) and the memory 32 (see FIG. 2) for generating the moving image data.

Further, the portable terminal 30 includes a timer 303 that counts time therein and provides a system time of the portable terminal 30, a time processing unit 304 for associating data with the time, and a composite processing unit 303 for combining still image data and audio data into moving image data.

6-2) Sequence of Moving Image Data Generation on Moving Image Capturing Mode

Figure 8:
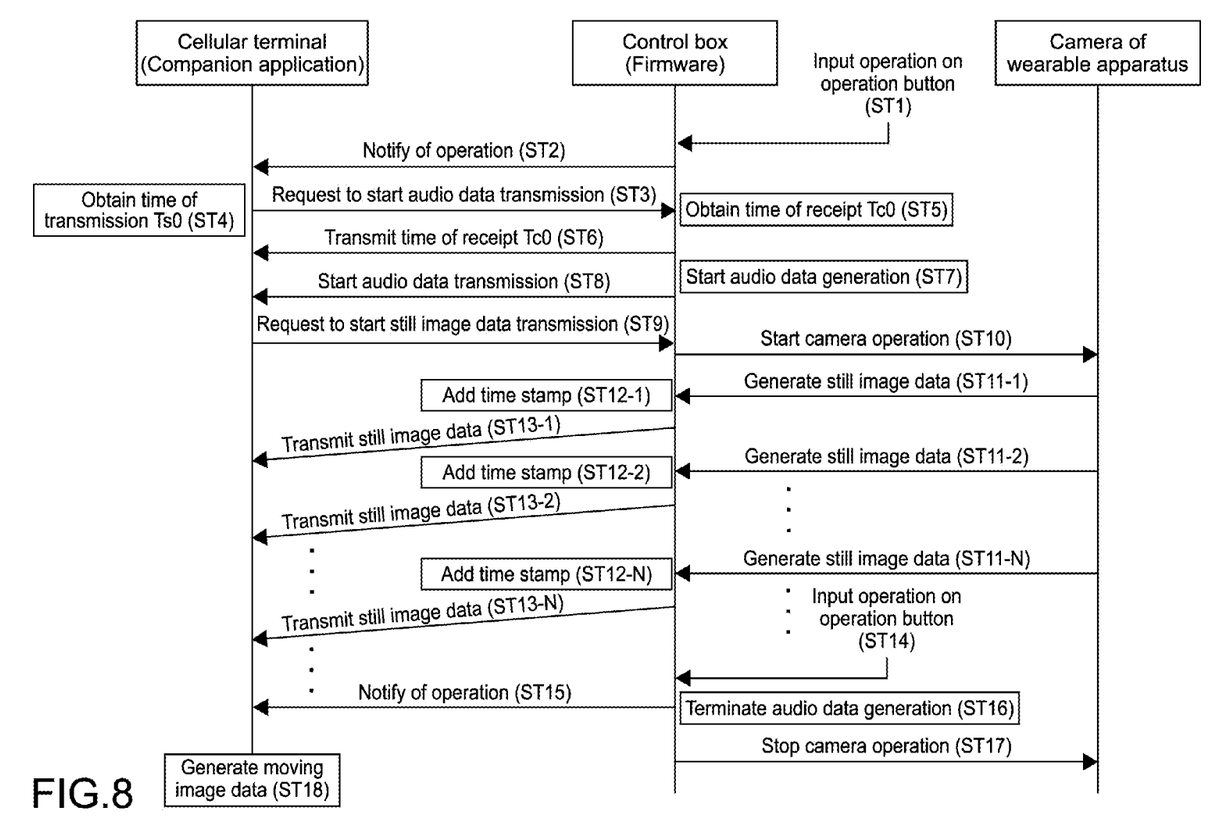
FIG. 8 is a sequence diagram showing a method of generating moving image data in the information processing system.

FIG. 8 shows a sequence of moving image data generation on the moving image capturing mode of the information processing system 100. The moving image data generation in the information processing system 100 will be described in details with reference to FIG. 8.

First, when the operation button 531 receives an input operation made by the user (ST1), the control box 50 transmits an operation notification for starting an operation on the moving image capturing mode to the portable terminal 30 through the transmission unit 502 (ST2).

When receiving an operation notification from the control box 50 through the reception unit 301, the portable terminal 30 transmits an audio data transmission start request for starting transmission of the audio data to the control box 50 through the transmission unit 302 (ST3).

The start request transmitted from the portable terminal 30 to the control box 50 is configured as a trigger for associating a time Ts of the timer 303 that is a system time of the portable terminal 30 with a time Tc of the timer 503 that is a system time of the control box 50.

Specifically, the portable terminal 30 obtains a time of transmission Ts0 when the start request is transmitted (ST4), from the timer 303 through the time processing unit 304. The control box 50 obtains a time of receipt Tc0 when the start request is received, from the timer 503 through the time processing unit 504 (ST5).

In addition, the control box 50 transmits the time of receipt Tc0 obtained by the time processing unit 304 to the portable terminal 30 through the transmission unit 502 (ST6).

Then, the portable terminal 30 receives a time of receipt Tc through the reception unit 301. With this, the portable terminal 30 is capable of knowing the time of transmission Ts0 obtained from the timer 303 of the portable terminal 30 and the time of receipt Tc0 obtained from the timer 503 of the control box 50.

The time taken to exchange the start request between the portable terminal 30 and the control box 50 is extremely short. Therefore, it is considered that the time of transmission Ts0 in the timer 303 of the portable terminal 30 and the time of receipt Tc0 in the timer 503 of the control box 50 indicate the same time.

This enables the portable terminal 30 that has received the time of receipt Tc0 to mutually convert the time Ts in the timer 303 of the portable terminal 30 and the time Tc in the timer 503 of the control box 50 according to Expressions (1) and (2) below.

$$Tc = Tc0 + (Ts - Ts0) \quad (1)$$

$$Ts = Ts0 + (Tc - Tc0) \quad (2)$$

In this manner, according to the start request transmitted from the portable terminal 30 to the control box 50, the portable terminal 30 is capable of knowing not only the time Ts in the timer 303 of the portable terminal 30 but also the time Tc in the timer 503 of the control box 50.

At the same time when the time of receipt Tc0 is transmitted (the ST6), the control box 50 uses the microphone 581 to start generation of the audio data (ST7). The control box 50 starts real-time transmission of the generated audio data to the portable terminal 30 through the transmission unit 502 (ST8).

As described above, the hands free profile (HFP) is used for the real-time transmission of the audio data to the portable terminal 30 through the transmission unit 502.

Note that, in this embodiment, it is considered that, in the real-time transmission of the audio data from the transmission unit 502 to the portable terminal 30, no time lag occurs. That is, it is considered that the time when the audio data is generated and the time when the portable terminal 30 receives the audio data are the same.

However, a time lag L1 between a time when the audio data is actually generated and a time when the portable terminal 30 receives the audio data may be considered. That is, it may be considered that a time obtained by subtracting the time lag L1 from the time when the portable terminal 30 receives the audio data may be considered as the time when the audio data is actually generated. The time lag L1 only needs to be measured and recorded on the memory 32 of the portable terminal 30 in advance.

The portable terminal 30 sequentially receives audio data through the reception unit 301. The portable terminal 30 records the audio data on the memory 32 such that the time Ts when the reception unit 301 receives the audio data, which is in the timer 303, is indicated. For example, the portable terminal 30 may sequentially embed times Ts in audio data pieces or may give audio data reception start/end time Ts to the audio data.

The portable terminal 30 that has started reception of the audio data through the reception unit 301 transmits a still image data transmission start request for starting transmission of the still image data, to the control box 50 through the transmission unit 302 (ST9).

When receiving the still image data transmission start request through the reception unit 501, the control box 50 starts an operation of the camera 78 of the wearable apparatus 70 (ST10). That is, the control box 50 continuously generates still image data pieces that are frames of the moving image data through the camera 78.

The still image data is generated per time corresponding to a frame rate set for the moving image data. The frame rate of the moving image data can be, for example, 30 frames per second (fps) or 15 fps.

Specifically, when the control box 50 starts an operation of the camera 78, the camera 78 repeatedly generates still image data pieces (ST11-1 to ST11-N). The control box 50 sequentially loads the still image data pieces generated by the camera 78 in the memory 52 and gives time stamps to the still image data pieces through the time processing unit 504 (ST12-1 to ST12-N).

The time stamp given to the still image data by the time processing unit 504 indicates the time Tc when the still image data is generated by the camera 78, which is in the timer 503. Note that the time stamp is not limited to a particular system and may be time information that enables the portable terminal 30 to know the time Tc from the still image data. That is, the time stamp includes all stamps and data including such time information.

The control box 50 sequentially transmits the still image data pieces given the time stamp pieces by the time processing unit 504, to the portable terminal 30 through the transmission unit 502 (ST13-1 to ST13-N).

As described above, the Wi-Fi is used for transmission of the still image data to the portable terminal 30 through the transmission unit 502. The still image data has a large volume, and hence a time lag occurs between transmission by the control box 50 and reception by the portable terminal 30. Therefore, in FIG. 8, "still image data transmission (ST13-1 to ST13-N)" is indicated by obliquely downward arrows.

The portable terminal 30 sequentially receives the still image data pieces through the reception unit 301 and stores the still image data pieces in the memory 32. With this, a group of still image data pieces in a time series is stored in the memory 32 of the portable terminal 30.

In this manner, until the operation button 531 receives an input operation made by the user again, the audio data and still image data pieces continue to be accumulated in the memory 32 of the portable terminal 30.

When the operation button 531 receives the input operation made by the user again (ST14), the control box 50 transmits an operation notification for terminating the operation on the moving image capturing mode to the portable terminal 30 (ST15), terminates the generation of the audio data (ST16), and stops the operation of the camera (ST17).

The portable terminal 30 combines, through a composite processing unit 305, the audio data and still image data pieces stored in the memory 32 to generate moving image data (ST18).

Specifically, the composite processing unit 305 first generates continuous video data in a time series, which is obtained by combining the still image data pieces according to the time stamps given to the still image data pieces. Note that, if the portable terminal 30 does not obtain some of the still image data pieces due to insufficient transmission speed of the still image data pieces, the composite processing unit 305 considers it as "drop frame."

The composite processing unit 305 replaces still image data not obtained due to the drop frame by still image data generated just before such still image data. This enables the composite processing unit 305 to smoothly generate the video data also if the drop frame occurs.

The composite processing unit 305 synchronizes and combines the video data with the audio data. The time Ts when the portable terminal 30 receives the audio data is given to the audio data as the time information. On the other hand, the time stamp indicating the time Tc is given to each still image data piece of the video data as the time information.

That is, the time Ts of the timer 303 of the portable terminal 30 is given for the time information of the audio data and the time Tc of the timer 503 of the control box 50 is given for the time information of the video data. Therefore, as the time information of the video data and audio data, it is necessary to use only either one of the time Ts and the time Tc.

Therefore, the information processing system 100 converts the time information of the audio data from the time Ts to the time Tc according to the Expression (1) or converts the time information of the video data from the time Tc to the time Ts according to the Expression (2).

This makes it possible to favorably synchronize the video data with the audio data, using the time information of the audio data and the time information of the video data.

The present technology is not limited to the above-mentioned embodiment and various other embodiments can be made.

The synchronization method according to the above-mentioned embodiment is not limited to the synchronization of the video data and audio data. The synchronization method according to the above-mentioned embodiment is also widely applicable to synchronization of data that is transmitted by a system capable of transmitting data including a time stamp with data that is transmitted by a system not capable of transmitting data including a time stamp.

In the above-mentioned embodiment, the time of transmission Ts0 and the time of receipt Tc0 of the audio data transmission start request are considered as being the same. However, a time lag L2 between the time of transmission Ts0 and the time of receipt Tc0 may be considered. That is, if a certain time lag L2 exists between the time of transmission Ts0 and the time of receipt Tc0, "Ts0+L2" and "Tc0" can be considered as those indicating the same time. The time lag L2 only needs to be measured and recorded on the memory 32 of the portable terminal 30 in advance.

In this case, Expressions (1) and (2) above can be changed to Expressions (1') and (2') below.

$$Tc=Tc0+\{Ts-(Ts0+L2)\} \quad (1')$$

$$Ts=(Ts0+L2)+(Tc-Tc0) \quad (2')$$

Further, in the above-mentioned embodiment, the audio data transmission start request is transmitted from the portable terminal 30 to the control box 50. However, the audio data transmission start request may be transmitted from the control box 50 to the portable terminal 30 in contrast. In this case, a time of transmission Tc0 when the control box 50 receives the audio data transmission start request and a time of receipt Ts0 when the portable terminal 30 receives the audio data transmission start request are used for synchronization of the still image data with the audio data. Note that, in this case, the arrow of "audio data transmission start request (ST3)" in FIG. 8 becomes opposite.

The wearable apparatus 70 according to the above-mentioned embodiment is connected to the control box 50 with a wire, that is, an electric cable. However, the wearable apparatus 70 may be integrated with the control box without the electric cable.

Although, in the above-mentioned embodiment, the portable cellular phone is used as the device functioning as the data generating apparatus, a non-portable device, for example, a desk top PC may be used.

At least two features of the features of the above-mentioned embodiment may be combined.

Note that the present technology may also take configurations as follows.

(1) An information processing apparatus, including:
a reception unit configured to receive a start request transmitted from an external apparatus;
a time processing unit configured to obtain a time of receipt when the reception unit receives the start request and to give a time stamp to first data; and
a transmission unit configured to transmit the time of receipt obtained by the time processing unit to the external apparatus, to transmit to the external apparatus the first data generated after the time of receipt and given the time stamp by the time processing unit, and to in real-time transmit second data generated after the time of receipt to the external apparatus.

(2) The information processing apparatus according to (1), in which the first data is still image data, and the second data is audio data.

(3) The information processing apparatus according to (2), in which the transmission unit is configured to transmit the still image data by Wi-Fi and transmit the audio data by Bluetooth (registered trademark).

(4) The information processing apparatus according to (2) or (3), further including:

a camera configured to generate the still image data; and a microphone configured to generate the audio data.

(5) The information processing apparatus according to (4), in which the camera is configured to be mountable on a head of a user.

(6) The information processing apparatus according to (4) or (5), in which the camera is configured to generate the still image data every predetermined period of time.

(7) The information processing apparatus according to any one of (1) to (6), further including an operation unit configured to receive an input operation made by a user, in which the transmission unit is configured to notify the external apparatus to transmit the start request when the operation unit receives the input operation.

(8) An information processing apparatus, including:

a transmission unit configured to transmit a start request to an external apparatus, to transmit to the external apparatus a time of transmission when the start request is transmitted, to transmit to the external apparatus first data generated after the time of transmission and given a time stamp, and to in real-time transmit second data generated after the time of transmission to the external apparatus; and a time processing unit configured to obtain the time of transmission and give the time stamp to the first data.

(9) A data generating apparatus, including:

a transmission unit configured to transmit a start request to an information processing apparatus;

a time processing unit configured to obtain a time of transmission when the transmission unit transmits the start request;

a reception unit configured to receive a time of receipt when the information processing apparatus receives the start request, which is obtained and transmitted by the information processing apparatus, to receive first data generated after the time of receipt, given a time stamp by the information processing apparatus, and transmitted, and to receive second data generated after the time of receipt and in real-time transmitted; and a composite processing unit configured to use the time of transmission obtained by the time processing unit and the time of receipt to synchronize the first data with the second data.

(10) The data generating apparatus according to (9), in which the composite processing unit is configured to consider the time of transmission as being the same as the time of receipt and synchronize the first data with the second data.

(11) The data generating apparatus according to (9) or (10), in which the first data is still image data, the second data is audio data, and the composite processing unit is configured to combine the still image data with the audio data to generate moving image data.

(12) The data generating apparatus according to any one of (9) to (11), in which the composite processing unit is configured to use a time lag in the real-time transmission of the second data for synchronizing the first data with the second data.

(13) An information processing method, including:

transmitting, by a second apparatus configured to be communicable with a first apparatus, a start request to the first apparatus;

obtaining, by the second apparatus, a time of transmission when the start request is transmitted;

receiving, by the first apparatus, the start request;

obtaining, by the first apparatus, a time of receipt when the start request is received;

transmitting, by the first apparatus, the time of receipt to the second apparatus;

giving, by the first apparatus, a time stamp to first data generated after the time of receipt;

transmitting, by the first apparatus, the first data given the time stamp by the second apparatus;

in real-time transmitting, by the first apparatus, second data generated after the time of receipt to the second apparatus;

receiving, by the second apparatus, the time of receipt, the first data, and the second data; and synchronizing, by the second apparatus, the first data with the second data, using the time of transmission and the time of receipt.

(14) An information processing system, including a first apparatus; and a second apparatus configured to be communicable with the first apparatus, the first apparatus including a reception unit configured to receive a start request transmitted by the second apparatus, a timer configured to count a first point of time, a time processing unit configured to obtain a time of receipt that is a first point of time when the reception unit receives the start request and to give the first data a time stamp based on the first point of time, and a transmission unit configured to transmit the time of receipt obtained by the time processing unit to the external apparatus, to transmit to the external apparatus the first data generated after the time of receipt and given the time stamp by the time processing unit, and to in real-time transmit second data generated after the time of receipt to the external apparatus, the second apparatus including a transmission unit configured to transmit the first apparatus to the start request, a timer configured to count a second point of time different from the first point of time, a time processing unit configured to obtain a time of transmission that is the second point of time when the transmission unit of the second apparatus transmits the start request, a reception unit configured to receive the time of receipt, the first data, and the second data that are transmitted by the first apparatus, and a composite processing unit configured to use the time of transmission obtained by the time processing unit of the second apparatus and the time of receipt to synchronize the first data with the second data.

It should be understood by those skilled in the art that various modifications, combinations, sub-combinations and alterations may occur depending on design requirements and other factors insofar as they are within the scope of the appended claims or the equivalents thereof.

What is claimed is:

1. A data generating apparatus, comprising circuitry configured to operate as:
   a transmission unit configured to transmit a start request to an information processing apparatus;
   a time processing unit configured to obtain a time of transmission when the transmission unit transmits the start request;
   a reception unit configured to receive a time of receipt when the information processing apparatus receives the start request, which is obtained and transmitted by the information processing apparatus, to receive first data generated after the time of receipt, given a time stamp by the information processing apparatus, and transmitted, and to receive second data generated after the time of receipt and in real-time transmitted; and
   a composite processing unit configured to use the time of transmission obtained by the time processing unit and the time of receipt to synchronize the first data with the second data.

2. The data generating apparatus according to claim 1, wherein
   the composite processing unit is configured to consider the time of transmission as being the same as the time of receipt and synchronize the first data with the second data.

3. The data generating apparatus according to claim 1, wherein
   the first data is still image data,
   the second data is audio data, and
   the composite processing unit is configured to combine the still image data with the audio data to generate moving image data.

4. The data generating apparatus according to claim 1, wherein
   the composite processing unit is configured to use a time lag in the real-time transmission of the second data for synchronizing the first data with the second data.

5. The data generating apparatus according to claim 1, wherein
   the circuitry comprises a CPU.

6. An information processing method, comprising:
   transmitting, by a second apparatus configured to be communicable with a first apparatus, a start request to the first apparatus;
   obtaining, by the second apparatus, a time of transmission when the start request is transmitted;
   receiving, by the first apparatus, the start request;
   obtaining, by the first apparatus, a time of receipt when the start request is received;
   transmitting, by the first apparatus, the time of receipt to the second apparatus;
   giving, by the first apparatus, a time stamp to first data generated after the time of receipt;
   transmitting, by the first apparatus, the first data given the time stamp by the second apparatus;
   in real-time transmitting, by the first apparatus, second data generated after the time of receipt to the second apparatus;
   receiving, by the second apparatus, the time of receipt, the first data, and the second data; and
   synchronizing, by the second apparatus, the first data with the second data, using the time of transmission and the time of receipt.

7. The information processing method according to claim 6, wherein
   the act of synchronizing the first data with the second data comprises considering the time of transmission as being the same as the time of receipt.

8. The information processing method according to claim 6, wherein
   the first data is still image data,
   the second data is audio data, and
   the method further comprises combining the still image data with the audio data to generate moving image data.

9. The information processing method according to claim 6, wherein
   the act of synchronizing the first data with the second data comprises using a time lag in the real-time transmission of the second data for synchronizing the first data with the second data.

10. An information processing system, comprising
    a first apparatus; and
    a second apparatus configured to be communicable with the first apparatus, the first apparatus including first circuitry configured to operate as:
      a reception unit configured to receive a start request transmitted by the second apparatus,
      a timer configured to count a first point of time,
      a time processing unit configured to obtain a time of receipt that is a first point of time when the reception unit receives the start request and to give the first data a time stamp based on the first point of time, and
      a transmission unit configured to transmit the time of receipt obtained by the time processing unit to the external apparatus, to transmit to the external apparatus the first data generated after the time of receipt and given the time stamp by the time processing unit, and to in real-time transmit second data generated after the time of receipt to the external apparatus, the second apparatus including second circuitry configured to operate as:
      a transmission unit configured to transmit the first apparatus to the start request,
      a timer configured to count a second point of time different from the first point of time,
      a time processing unit configured to obtain a time of transmission that is the second point of time when the transmission unit of the second apparatus transmits the start request,
      a reception unit configured to receive the time of receipt, the first data, and the second data that are transmitted by the first apparatus, and
      a composite processing unit configured to use the time of transmission obtained by the time processing unit of the second apparatus and the time of receipt to synchronize the first data with the second data.

11. The information processing system according to claim 10, wherein
    the composite processing unit is configured to consider the time of transmission as being the same as the time of receipt and synchronize the first data with the second data.

12. The information processing system according to claim 10, wherein
    the first data is still image data,
    the second data is audio data, and
    the composite processing unit is configured to combine the still image data with the audio data to generate moving image data.

13. The information processing system according to claim 10, wherein the composite processing unit is configured to use a time lag in the real-time transmission of the second data for synchronizing the first data with the second data.

14. The information processing system according to claim 10, wherein
the first circuitry comprises a first CPU, and
the second circuitry comprises a second CPU.

* * * * *